US012602607B2

(12) United States Patent
Naveh et al.

(10) Patent No.: US 12,602,607 B2
(45) Date of Patent: Apr. 14, 2026

(54) DETERMINING AN IMPLEMENTATION OF A QUANTUM PROGRAM THAT HAS A MINIMIZED OVERALL ERROR RATE

(71) Applicant: Classiq Technologies LTD., Tel Aviv (IL)

(72) Inventors: Amir Naveh, Haifa (IL); Shmuel Ur, Shorashim (IL); Israel Reichental, Haifa (IL); Ravid Alon, Tel Aviv (IL); Ofek Kirzner, Haifa (IL); Yehuda Naveh, Tel-Aviv Yafo (IL)

(73) Assignee: Classiq Technologies LTD., Tel Aviv (IL)

( * ) Notice: Subject to any disclaimer, the term of this patent is extended or adjusted under 35 U.S.C. 154(b) by 356 days.

(21) Appl. No.: 18/360,047

(22) Filed: Jul. 27, 2023

(65) Prior Publication Data

US 2025/0363406 A1     Nov. 27, 2025

(51) Int. Cl.
*G06N 10/70* (2022.01)
*G06F 11/00* (2006.01)
*G06F 11/07* (2006.01)
*G06N 10/40* (2022.01)

(52) U.S. Cl.
CPC ........... *G06N 10/70* (2022.01); *G06F 11/079* (2013.01); *G06N 10/40* (2022.01)

(58) Field of Classification Search
CPC ....... G06N 10/70; G05N 10/40; G06F 11/079
See application file for complete search history.

(56) References Cited

U.S. PATENT DOCUMENTS

| | | | | |
|---|---|---|---|---|
| 10,922,460 | B1 * | 2/2021 | Lee ........................ | G06N 10/70 |
| 11,288,589 | B1 * | 3/2022 | Naveh .................... | G06N 10/00 |
| 11,294,797 | B1 * | 4/2022 | Naveh ................. | G06F 11/3698 |
| 11,429,512 | B1 * | 8/2022 | Naveh .................... | G06N 10/00 |
| 11,615,337 | B1 * | 3/2023 | Naveh .................... | G06N 10/20 |
| | | | | 714/10 |
| 11,983,600 | B2 * | 5/2024 | Bello .................... | G06N 10/80 |
| 12,436,742 | B2 * | 10/2025 | Naveh .................... | G06F 8/443 |
| 12,450,511 | B2 * | 10/2025 | Naveh .................... | G06N 3/126 |
| 2022/0092460 | A1 * | 3/2022 | Piveteau ............... | G06N 10/70 |
| 2023/0023333 | A1 * | 1/2023 | Naveh .................... | G06F 3/016 |
| 2023/0032530 | A1 * | 2/2023 | Naveh .................... | G06N 10/80 |
| 2023/0048091 | A1 * | 2/2023 | Leppaekangas ........ | G06F 30/20 |
| 2023/0099621 | A1 * | 3/2023 | Shi ........................ | G06N 10/80 |
| 2023/0102347 | A1 * | 3/2023 | Gutierrez ............... | G06N 10/00 |
| | | | | 716/116 |

(Continued)

*Primary Examiner* — Jonathan D Gibson
(74) *Attorney, Agent, or Firm* — Tutunjian & Bitetto, P.C.

(57) ABSTRACT

A method, apparatus and product comprising: obtaining alternative quantum circuits implementing a quantum program, each having a respective design error; identifying, for each quantum circuit, respective quantum resources that are used by the quantum circuit and are associated with respective hardware errors of a quantum computer; determining a total hardware error bound for the quantum circuit; determining a total error bound for the quantum circuit; applying a search algorithm over a plurality of total error bounds of the plurality of alternative quantum circuits, to identify an optimal total error bound that is associated with an optimal quantum circuit; and providing the optimal quantum circuit for execution on the quantum computer.

18 Claims, 9 Drawing Sheets

510 OBTAIN ALTERNATIVE CIRCUITS

520 IDENTIFY QUANTUM RESOURCES

530 DETERMINE A TOTAL HARDWARE ERROR

540 DETERMINE A TOTAL ERROR BOUND

550 APPLY A SEARCH ALGORITHM

560 EXECUTE A CIRCUIT

(56) References Cited

U.S. PATENT DOCUMENTS

| | | | | |
|---|---|---|---|---|
| 2023/0111039 A1* | 4/2023 | Naveh | G06F 8/41 | |
| | | | 716/100 | |
| 2023/0111924 A1* | 4/2023 | Naveh | G06N 10/20 | |
| | | | 716/100 | |
| 2023/0112525 A1* | 4/2023 | Naveh | G06N 10/00 | |
| | | | 716/100 | |
| 2023/0196171 A1* | 6/2023 | Griffin | G06N 10/60 | |
| | | | 703/26 | |
| 2023/0229491 A1* | 7/2023 | Coady | G06N 10/00 | |
| | | | 718/102 | |
| 2023/0244972 A1* | 8/2023 | Griffin | G06N 10/80 | |
| | | | 706/62 | |
| 2023/0419159 A1* | 12/2023 | Heo | H03M 13/00 | |
| 2024/0062087 A1* | 2/2024 | Chaplin | G06N 10/20 | |
| 2024/0078088 A1* | 3/2024 | Naveh | G06F 8/24 | |
| 2024/0354630 A1* | 10/2024 | Lee | G06N 10/40 | |
| 2025/0013907 A1* | 1/2025 | Wang | G06N 10/70 | |
| 2025/0131300 A1* | 4/2025 | Werner | G06N 10/20 | |
| 2025/0209368 A1* | 6/2025 | Sharma | G06N 10/20 | |

* cited by examiner

510

OBTAIN ALTERNATIVE CIRCUITS

520

IDENTIFY QUANTUM RESOURCES

530

DETERMINE A TOTAL HARDWARE ERROR

540

DETERMINE A TOTAL ERROR BOUND

550

APPLY A SEARCH ALGORITHM

560

EXECUTE A CIRCUIT

DETECT AN OPTIMUM ERROR POINT FOR EACH HARDWARE
— 610

SELECT AN OPTIMAL HARDWARE
— 620

EXECUTE A CIRCUIT ON THE OPTIMAL HARDWARE
— 630

DETERMINING AN IMPLEMENTATION OF A QUANTUM PROGRAM THAT HAS A MINIMIZED OVERALL ERROR RATE

TECHNICAL FIELD

The present disclosure relates to quantum computing in general, and to determining program implementation with a minimized overall error rate, in particular.

BACKGROUND

Quantum computing is a computational paradigm that is fundamentally different from classic computing. In contrast to classic computing, which utilizes bits, quantum computing utilizes qubits. The qubits have unique features, as each qubit can be in superposition, several qubits can be entangled, and all operations on qubits, referred to as quantum gates, must be reversible, e.g., besides measurement operations. Temporarily computed values are stored on additional helper qubits, referred to as auxiliary qubits.

In some exemplary embodiments, a quantum circuit may comprise a series of operations acting on an initial quantum state: $|\Psi_i\rangle \langle \Psi_i|$, providing a final quantum state: $|\Psi_f\rangle \langle \Psi_f|$.

BRIEF SUMMARY

One exemplary embodiment of the disclosed subject matter is a method comprising: obtaining a plurality of alternative quantum circuits implementing a quantum program, each of the plurality of alternative quantum circuits having a respective design error; identifying, for each quantum circuit of the plurality of alternative quantum circuits, respective quantum resources that are used by the quantum circuit, the quantum resources comprising components that are associated with respective hardware errors of a quantum computer, the components comprising at least a quantum gate; based on the quantum resources and the respective hardware errors, determining a total hardware error bound for the quantum circuit; based on the total hardware error bound and based on a design error of the quantum circuit, determining a total error bound for the quantum circuit; applying a search algorithm over a plurality of total error bounds of the plurality of alternative quantum circuits, to identify an optimal total error bound that is lesser than other total error bounds, wherein the optimal total error bound is associated with an optimal quantum circuit from the plurality of alternative quantum circuits; and providing the optimal quantum circuit for execution on the quantum computer.

Optionally, the method comprises providing the plurality of alternative quantum circuits to be optimized by a compiler, thereby obtaining a plurality of optimized quantum circuits, wherein said identifying the respective quantum resources is performed with respect to the plurality of optimized quantum circuits.

Optionally, a hardware error of the quantum gate indicates an estimated probability of the quantum gate of the quantum computer not to function properly.

Optionally, the components comprise a qubit, a cycle, a defined type of gate, or the like.

Optionally, said obtaining comprises obtaining the plurality of alternative quantum circuits from a library that retains a plurality of quantum implementations of the quantum program.

Optionally, the method comprises obtaining the quantum program, wherein said obtaining comprises synthesizing the plurality of alternative quantum circuits based on the quantum program.

Optionally, said synthesizing comprises dynamically generating the plurality of alternative quantum circuits according to a respective plurality of design errors.

Optionally, the design error comprises an intended error for the quantum circuit that is intended to reduce a resource utilization of the quantum circuit.

Optionally, the search algorithm comprises a gradual assent algorithm, a hill climbing algorithm, a binary search algorithm, or the like.

Optionally, the method comprises executing the optimal quantum circuit on the quantum computer.

Optionally, the method comprises obtaining a plurality of quantum programs, the plurality of quantum programs comprising the quantum program; performing said obtaining for each of the plurality of quantum programs, thereby obtaining a second plurality of quantum circuits; performing said identifying, said determining the total hardware error bound, and said determining the total error bound for each circuit of the second plurality of quantum circuits; based on global constraints of the quantum computer, applying the search algorithm over total error bounds of the second plurality of quantum circuits, the search algorithm is configured to find, for each of the plurality of quantum programs, an optimal quantum circuit from the second plurality of quantum circuits that complies with the global constraints, and reduces an overall error rate of a joint quantum circuit that comprises a respective circuit from the second plurality of quantum circuits for each of the plurality of quantum programs; executing the joint quantum circuit on the quantum computer.

Optionally, the plurality of quantum programs comprises first and second quantum programs, wherein the second plurality of quantum circuits comprises a first set of alternative quantum circuits that implement the first quantum program, and a second set of alternative quantum circuits that implement the second quantum program, each circuit of the first set of alternative quantum circuits having a different design error, each circuit of the second set of alternative quantum circuits having a different design error.

Another exemplary embodiment of the disclosed subject matter is a computer program product comprising a non-transitory computer readable medium retaining program instructions, which program instructions when read by a processor, cause the processor to: obtain a plurality of alternative quantum circuits implementing a quantum program, each of the plurality of alternative quantum circuits having a respective design error; identify, for each quantum circuit of the plurality of alternative quantum circuits, respective quantum resources that are used by the quantum circuit, the quantum resources comprising components that are associated with respective hardware errors of a quantum computer, the components comprising at least a quantum gate; based on the quantum resources and the respective hardware errors, determine a total hardware error bound for the quantum circuit; based on the total hardware error bound and based on a design error of the quantum circuit, determine a total error bound for the quantum circuit; apply a search algorithm over a plurality of total error bounds of the plurality of alternative quantum circuits, to identify an optimal total error bound that is lesser than other total error bounds, wherein the optimal total error bound is associated with an optimal quantum circuit from the plurality of alternative quantum circuits; and provide the optimal quantum circuit for execution on the quantum computer.

Yet another exemplary embodiment of the disclosed subject matter is an apparatus comprising a processor and coupled memory, said processor being adapted to: obtain a plurality of alternative quantum circuits implementing a quantum program, each of the plurality of alternative quantum circuits having a respective design error; identify, for each quantum circuit of the plurality of alternative quantum circuits, respective quantum resources that are used by the quantum circuit, the quantum resources comprising components that are associated with respective hardware errors of a quantum computer, the components comprising at least a quantum gate; based on the quantum resources and the respective hardware errors, determine a total hardware error bound for the quantum circuit; based on the total hardware error bound and based on a design error of the quantum circuit, determine a total error bound for the quantum circuit; apply a search algorithm over a plurality of total error bounds of the plurality of alternative quantum circuits, to identify an optimal total error bound that is lesser than other total error bounds, wherein the optimal total error bound is associated with an optimal quantum circuit from the plurality of alternative quantum circuits; and provide the optimal quantum circuit for execution on the quantum computer.

Yet another exemplary embodiment of the disclosed subject matter is a system comprising a processor and coupled memory, said processor being adapted to: obtain a plurality of alternative quantum circuits implementing a quantum program, each of the plurality of alternative quantum circuits having a respective design error; identify, for each quantum circuit of the plurality of alternative quantum circuits, respective quantum resources that are used by the quantum circuit, the quantum resources comprising components that are associated with respective hardware errors of a quantum computer, the components comprising at least a quantum gate; based on the quantum resources and the respective hardware errors, determine a total hardware error bound for the quantum circuit; based on the total hardware error bound and based on a design error of the quantum circuit, determine a total error bound for the quantum circuit; apply a search algorithm over a plurality of total error bounds of the plurality of alternative quantum circuits, to identify an optimal total error bound that is lesser than other total error bounds, wherein the optimal total error bound is associated with an optimal quantum circuit from the plurality of alternative quantum circuits; and provide the optimal quantum circuit for execution on the quantum computer.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
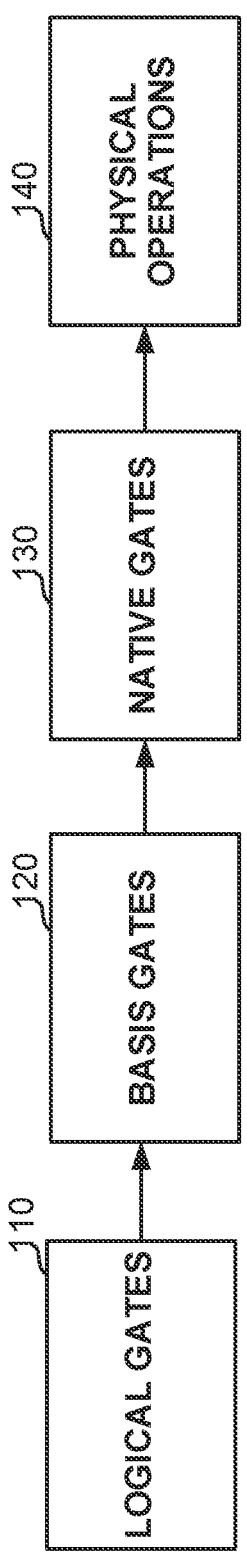
FIG. 1 shows an exemplary diagram of a compilation process, in accordance with some exemplary embodiments of the disclosed subject matter.

One technical problem dealt with by the disclosed subject matter is to select an efficient implementation of a quantum program. In some exemplary embodiments, quantum programs may be designed, programmed or created by a user, a programmer, an operator, or the like, using gate-level programming, using functional-level code, using evolutionary computing techniques such as Quantum Genetic Algorithm (QGA), using genetic algorithms, or the like. In some cases, a quantum program may be also referred to as a logical representation of a quantum circuit. In some exemplary embodiments, after an initial quantum program is created, it may go through multiple processing stages such as compilation stages, transpilation stages, or the like, before becoming an executable quantum circuit that can be executed on a target quantum computer, simulated by a simulation software, or the like. A quantum computer may refer to a quantum cloud, a quantum computer, or the like. In some cases, any quantum circuit resulting from the processing stages may comprise an implementation of the respective quantum program, and may be referred to as the gate-level implementation of the program.

In some exemplary embodiments, a quantum program may be implementable by a plurality of alternative gate-level implementations. In some exemplary embodiments, each alternative gate-level implementation may implement the logical representation of the circuit using a different set of gates, cycles and qubits, according to hardware requirements of the target quantum computer, according to availability of resources at the target quantum computer, or the like. For example, a first quantum computer may have ten quantum gates of a first type, and a second quantum computer may not have any gates of the first type. It is noted that quantum gates may refer also to quantum state measurements, such as mid-circuit measurements, final circuit measurements, or the like. In case a quantum program is configured to use three gates of the first type, and to be executed by the second quantum computer, the hardware compiler of the second quantum computer may utilize alternative gates that create a same quantum state, and are available in the second quantum computer. In some cases, additional details regarding how a quantum program can be implementable by a plurality of alternative gate-level implementations is disclosed in U.S. Patent Publication 2023/0111924, entitled "Functional-Level Processing Component for Quantum Computers", published Apr. 13, 2023, which is hereby incorporated by reference in its entirety for all purposes without giving rise to disavowment.

It may be desired to find an optimal gate-level implementation of a quantum program, in a manner that minimizes the overall error rate of the gate-level implementation. The optimal gate-level implementation may be executed on a target quantum computer, executed on a cloud, or the like. For clarity reasons, the disclosed subject matter may refer to executions on a quantum computer, although any other execution may be intended thereby, e.g., an execution on a quantum cloud.

It is noted that the term "optimal" should not be narrowly construed as the most desirable or best. Instead, the term should be construed to cover approximated "good enough" solutions that are not necessarily the best available solution. Hence, an "optimal gate level implementation" may be improved with respect to a potential gate-level implementation, such as the implementation that would have normally been generated without the application of the disclosed subject matter, but there may be another gate-level implementation that out-performs the optimal gate level implementation.

Another technical problem dealt with by the disclosed subject matter is to identify an optimal design error for implementing the quantum program. For example, it may be desired to select a design error for generating the gate-level implementation, in a manner that reduces a number of resources that are used, balances a hardware error of the program, or the like. In some cases, resources may refer to quantum resources such as qubits, gates, cycles, allocations of physical qubits, or the like. The number of resources may refer to any weighted or non-weighted metric that combines cost functions associated with each resource type.

Yet another technical problem dealt with by the disclosed subject matter is to estimate an overall error rate of various gate-level implementations of a quantum program, e.g., in order to perform an informed selection of a gate-level implementation.

Yet another technical problem dealt with by the disclosed subject matter is to identify a minimal number of resources that is required for executing a gate-level implementation of a program on the target computer, in order to ensure that the gate-level implementation complies with an error threshold. For example, a programmer may provide an error threshold of 2%, indicating that the quantum program should be implemented with an overall error rate of at most 2%, using a minimal number of resources. The compiler may not be able to provide this data, at least since the compiler may not be aware of design error, may not take into account various errors such as input errors, may not be aware of one or more hardware errors of the target quantum computer, or the like. It may be desired to identify the minimal number of resources that can be used to implement a program in a manner that complies with an error threshold, and to provide the user with a corresponding circuit implementation.

Yet another technical problem dealt with by the disclosed subject matter is to identify a quantum computer that enables to implement a quantum circuit using a reduced number of resources compared to other available quantum computers.

Yet another technical problem dealt with by the disclosed subject matter is to find, for a plurality of quantum programs, each one with a respective error threshold, an optimal gate-level implementation of the quantum programs with respect to a target quantum computer. It may be desired that the gate-level implementation minimizes a number of resources, minimizes an overall error rate, or the like.

In some exemplary embodiments, a quantum state may be described by probability amplitudes. In some exemplary embodiments, a quantum circuit may comprise a series of operations acting on an initial quantum state: $|\Psi_i\rangle \langle \Psi_i|$, providing a final quantum state: $|\Psi_f\rangle \langle \Psi_f|$, in which i denotes initial, and f denotes final. In some exemplary embodiments, the initial and final states may each be represented as a respective density matrix in a $2^n \times 2^n$ dimensional space, with n being the number of qubits in the quantum circuit. In some exemplary embodiments, the final state of the quantum circuit may represent an output of the quantum circuit, and may be accessed indirectly, such as via measurements, quantum tomography, or the like.

In some exemplary embodiments, the series of operations acting on the initial quantum state may comprise quantum gates, mid-circuit measurements of individual qubits, or the like. For example, under perfect and infeasible conditions, each quantum gate that is not a measurement operation may correspond exactly to one or more unitary, reversable operators, which may be represented by unitary matrices relative to a given basis. As another example, under perfect and infeasible conditions, quantum gates may correspond exactly to one or more non-unitary operators, which may be represented by respective matrices relative to a certain basis. In reality, neither of these scenarios may take place, and operations of quantum gates may deviate from the intended unitary or non-unitary operations, such as due to noise.

In some exemplary embodiments, each quantum gate may act on one or more qubits. In some exemplary embodiments, in order to apply gates to the initial state, the gates may be translated, or decomposed, into a series of physical operations via a compiler, e.g., as part of a compilation process. It is noted that the compiler may refer to one or more classical compilers, quantum compilers, or the like, between which one or more processing operations may be shared, distributed, or the like.

Referring now to FIG. 1, showing exemplary diagram of a compilation process, in accordance with some exemplary embodiments of the disclosed subject matter.

In some exemplary embodiments, at a first stage of the compilation process, a quantum program may be represented by Logical Gates 110. In some exemplary embodiments, the compilation process may be configured to reduce, convert, unroll, or decompose Logical Gates 110 into building blocks referred to as "basis gates", e.g., Basis Gates 120. For example, Basis Gates 120 may correspond, logically, to the assembling stage in classical programming. In some exemplary embodiments, the selection of Basis Gates 120 may depend on hardware settings of a target quantum computer over which the quantum program is planned to be executed.

In some exemplary embodiments, Basis Gates 120 may or may not comprise atomic physical operations (also referred to as "native gates"). In some exemplary embodiments, basis gates from Basis Gates 120 that do not correspond to atomic physical operations, may be reduced or converted to Native Gates 130. For example, Basis Gates 120 may be converted to Native Gates 130. In some cases, both Basis Gates 120 and Native Gates 130 may comprise logical operations and may be represented by unitary matrices (e.g., matrices that preserves the norm and inner product of the quantum state). In case that Basis Gates 120 comprise only atomic physical operations, Basis Gates 120 may correspond to Native Gates 130 and a conversion from Basis Gates 120 to Native Gates 130 may be redundant, and may be omitted from the compilation process.

In some exemplary embodiments, after the compilation process reaches a stage in which the quantum program is fully represented by Native Gates 130, Native Gates 130 may be converted into a sequence of scheduled Physical Operations 140 on the respective quantum computer, acting on the physical qubits, and may be used to execute the quantum program.

In some exemplary embodiments, at each stage of the compilation process, the compiler may or may not apply certain optimizations in order to reduce the resources required for executing the quantum program. For example, during the conversion to Physical Operations 140, the compiler may be configured to schedule one or more hardware-level error suppression operations, which may be applied during the execution. In some exemplary embodiments, in some cases, prior to converting Native Gates 130 to Physical Operations 140, the compiler may not directly perform error reduction operations, but rather may perform resource optimizations that may result with error reductions (e.g., a reduction in a hardware error). For example, during a qubit placement operation, the compiler may assign logical qubits to physical qubits in an optimized manner that reduces resource consumption, increases a performance of the circuit, or the like. As another example, when processing Logical Gates 110, the compiler may set one or more routing operations that are configured to route data between physical qubits that are not directly connected within the target quantum computer. In such cases, information from one qubit may be routed to another qubit via other qubits, e.g., using "swap" gates that may be decomposed into Basis Gates 120 subsequently. According to this example, the compiler may or may not apply certain optimizations, such as in order to reduce the number of swap gates.

In some exemplary embodiments, although the compiler may be enabled to apply certain optimizations, the compiler may be limited, and may not be able to perform optimization for all error types, according to a desired tradeoff between errors, or the like. For example, the compiler may not be aware of various errors. It may be desired to overcome such drawbacks.

In some exemplary embodiments, when executed on a quantum computer, the operations of the quantum circuit (e.g., Physical Operations 140) may not be perfect, and may deviate from their intended performance in various ways. In some exemplary embodiments, such deviations may be referred to herein as 'errors'. In some exemplary embodiments, such errors may originate from various sources, e.g., qubit initializations, measurement errors, algorithm errors (e.g., value approximations), qubit leakage, a loss of coherence at long runtimes, qubit cross-talk, design errors, or the like, e.g., as depicted in FIG. 2.

Figure 2:
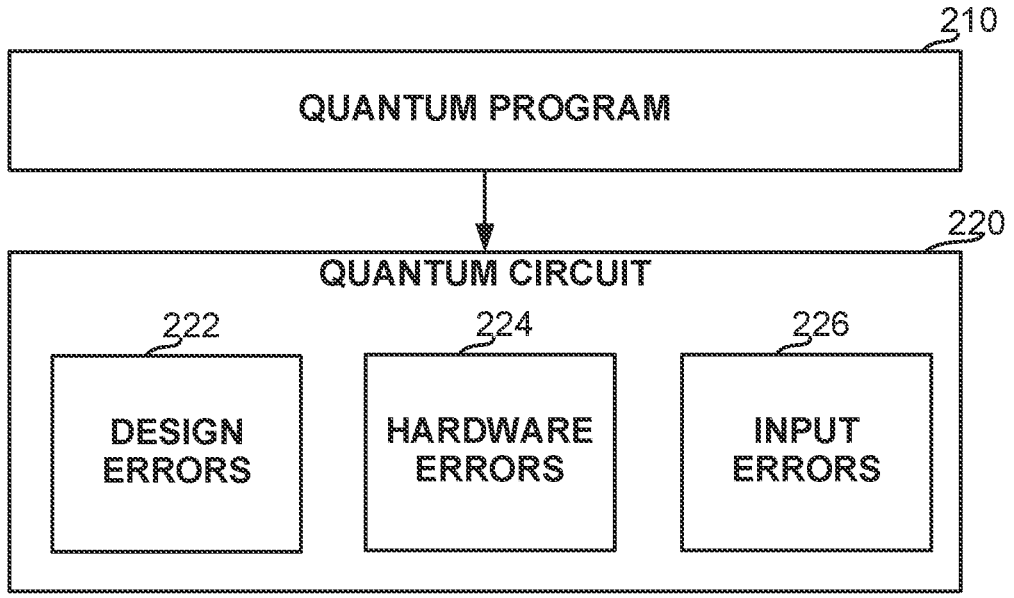
FIG. 2 shows an exemplary accumulation of errors, in accordance with some exemplary embodiments of the disclosed subject matter.

Referring now to FIG. 2, showing an exemplary accumulation of errors, in accordance with some exemplary embodiments of the disclosed subject matter.

As depicted in FIG. 2, at a first stage, a Quantum Program 210 is obtained, determined, or the like. In some exemplary embodiments, Quantum Program 210 may be processed, during one or more processing stages, until becoming a quantum circuit, e.g., a gate-level implementation of Quantum Program 210 such as Quantum Circuit 220. For example, Quantum Circuit 220 may be generated by a compiler, a software agent, a program designer (e.g., who designed Quantum Program 210), a combination thereof, or the like. In some exemplary embodiments, Quantum Circuit 220 may accumulate one or more errors, or deviations from the intended functionality of Quantum Program 210.

For example, Quantum Circuit 220 may accumulate Design Errors 222, also referred to as 'approximation errors' or 'systematic errors'. In some exemplary embodiments, Design Errors 222 may comprise intended deviations from Quantum Program 210, which are designed to reduce the number of resources that is necessary for executing a gate-level implementation of Quantum Program 210. Design Errors 222 may not be hardware dependent. In some cases, a quantum program may require an unfeasible or impractical number of resources, such as a very long runtime or a large number of qubits that is not available in a target quantum computer. In some cases, such a program may be replaced, deliberately, with a more realistic program aimed at achieving similar functionality at the cost of having a finite probability of obtaining an erroneous output, e.g., by the program designer, by a programmer, by the compiler, or the like, such as using a circuit synthesizer. For example, a specific gate of Quantum Circuit 220, e.g., denoted as $U$, may be replaced with an approximated gate that comprises a unitary operation, matrix, or the like, e.g., denoted by $\tilde{U}$.

Figure 3:
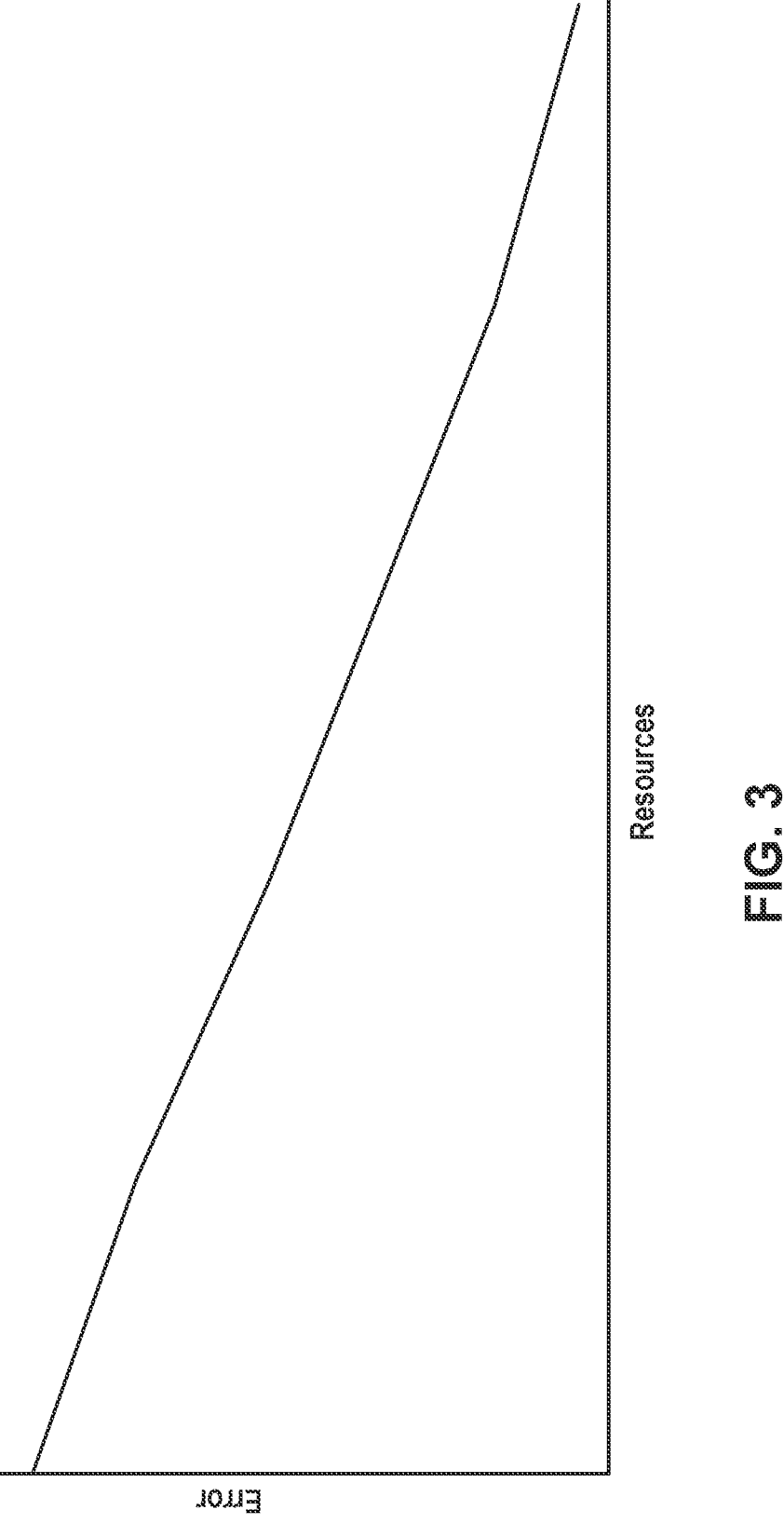
FIG. 3 shows an exemplary dual-axis chart, in accordance with some exemplary embodiments of the disclosed subject matter.

In some exemplary embodiments, Design Errors 222 may be incorporated based on a trade-off between the error rate of Quantum Circuit 220 and the number of resources required to run Quantum Circuit 220. For example, an exemplary distribution of such a tradeoff is depicted in FIG. 3. In some exemplary embodiments, as a circuit utilizes more resources (e.g., is longer, wider, or the like), its design error will be lower. In order to reduce resources, Design Errors 222 may be incorporated within Quantum Circuit 220 while calculating approximations of Design Errors 222, upper bounds thereof, or the like, which can be used to adjust, or rectify, the final state of Quantum Circuit 220. For example, a design error may be introduced by truncating a portion of Quantum Circuit 220. In some cases, the design error of the replacement program (e.g., the realistic program) may be calculated. As another example, an upper bound of the design error may be guaranteed, calculated, or the like, such as by using one or more metrics, heuristics, or the like.

As another example, Quantum Circuit 220 may accumulate Hardware Errors 224. In some exemplary embodiments, Hardware Errors 224 may originate from various noise sources, and may be hardware specific. In some cases, various operations, such as basis gates (Basis Gates 120 of FIG. 1), state measurements, or the like, may be susceptible to Hardware Errors 224. For example, a basis gate may have a probability of being performed successfully 99.8% of the time, indicating a hardware error 0.2% of the time. In some exemplary embodiments, Hardware Errors 224 may be estimated for specific circuit components, and not for an entire program.

In some exemplary embodiments, Hardware Errors 224 may fluctuate, and may not always be calculated accurately for every executed program, circuit component, or the like. In some exemplary embodiments, it may be challenging, or even impossible, to calculate hardware errors accurately for every executed program. In some cases, when possible, hardware errors of different quantum operations may be estimated independently of other error sources, in one or more manners. In some cases, the magnitude of Hardware Errors 224 may be estimated by manufacturers of the target quantum computer, hardware providers, or the like, as they may be hardware specific, and may be provided to users of the quantum computer. In some cases, the magnitude of Hardware Errors 224 may be provided as a benchmark, such as from third party entities using known protocols, such as randomized benchmarking. In some cases, the magnitude of Hardware Errors 224 may be estimated locally, such as by a programmer using a quantum computer. In some cases, the magnitude of Hardware Errors 224 may be estimated at a combination of sources. For example, manufacturers may approximate some types of circuit components, and the remaining types of circuit components may be approximated as a benchmark or locally.

For example, for each type of basis gate, a corresponding probability that the gate will function properly, referred to as the hardware error of the basis gate, may be provided, estimated, or the like. According to this example, the error may indicate a level of noise associated with an operation of an individual basis gate, which may not guarantee that a resulting gate operation is still unitary, and thus the description of the gate may be generalized to the quantum operations: E. As another example, for one or more measurement operations, corresponding probabilities that the measurement will function properly, referred to as the hardware error of the measurement operation, may be provided, estimated, or the like. As another example, a probability of a loss of coherence, indicating a loss of entangled states over long runtimes, may be estimated, provided, or the like, and may increase linearly with the number of cycles. As another example, one or more initiations errors of the target quantum computer, referred to as the 'initial state preparation error' may be provided, estimated, or the like. As another example, any other component or operation of a circuit, a hardware over which it is executed, or the like, may have a corresponding error probability that may be provided, estimated, or the like. For example, additional hardware errors may originate from qubit crosstalk (e.g., during which a desired operation on one or more qubits unintentionally affects other qubits, such as due to the quantum entanglement property, electromagnetic interference, or the like), correlations between basis gate errors, or the like. Such errors may be estimated locally, provided to the user, or the like.

As another example, Quantum Circuit 220 may accumulate Input Errors 226, e.g., quantum input errors, classical input errors, or both. In some cases, Quantum Program 210 may be programmed to receive input from a quantum source, such as from a quantum sensor, from data (e.g., classical data) encoded in a quantum state, or the like. In some exemplary embodiments, this input may be subject to errors, referred to as 'quantum input error', such as due to external circumstances. In some cases, Quantum Program 210 may be programmed as a function of external, classical information. In such cases, Quantum Program 210 may be programmed to receive input from a classical source, such as parametric circuits, arithmetic operations with constants, or the like. In some exemplary embodiments, this input may be subject to errors, referred to as 'classical input error', such as due to external circumstances.

In some exemplary embodiments, the compiler may not necessarily be able to recognize one or more of Design Errors 222, Hardware Errors 224, Input Errors 226, or the like, to which Quantum Circuit 220 may be susceptible. For example, the compiler may not be able to estimate any hardware error, design error, and input error. In some exemplary embodiments, without recognizing the error rates of Quantum Circuit 220, the compiler may not be able to adjust, or rectify, erroneous states according to the errors, and the errors may propagate exponentially, causing the qubit states to become unusable. In some cases, quantum states may not be pure but rather mixed, which may increase the uncertainty. For example, quantum states may be maximally mixed, or mixed in any other level (e.g., as defined by the Von-Neumann entropy).

One technical solution provided by the disclosed subject matter comprises selecting a circuit implementation of a quantum program with a minimized total error rate. In some exemplary embodiments, different circuit implementations may be generated according to one or more ranges or values of design errors. For example, the circuit implementation may be selected based on design errors, which may not be known to the compiler. In some exemplary embodiments, the different circuit implementations may be analyzed to identify components thereof, and an overall hardware error of each circuit implementation may be determined based on the hardware error rate of each component. In some exemplary embodiments, for each circuit, the overall hardware error may be combined with the design error, to obtain an overall error rate. In some exemplary embodiments, a search space of overall error rates of the circuit implementations may be searched to identify a lowest overall error rate, and the respective circuit may be executed on a target quantum computer.

In some exemplary embodiments, a quantum program may be implemented by a plurality of alternative quantum circuits, gate-level implementations, or the like, which may vary in their design error. In some cases, the quantum program may comprise basic building blocks, such as one or more unitary matrixes, indicating an intended functionality of the quantum program. In some exemplary embodiments, a quantum program may be synthesized according to a given design error, e.g., to comply with the given design error. In some cases, the design error may be indicated as an offset from the ideal functionality, a level of error that can be tolerated (an error threshold) in the implementation, an allowed approximation level of the program in the implementation, or the like, and may or may not be provided by a user.

In some exemplary embodiments, a circuit synthesizer may be configured to obtain a quantum program, function, or the like, as a first parameter, to obtain a range of one or more design errors, as a second parameter, and to synthesize a corresponding quantum circuit. For example, the second parameter may comprise a defined range of average fidelity loss values of a design error. In some exemplary embodiments, the synthesized quantum circuit may implement at least a portion of the intended functionality of the quantum program, according to its design error. For example, in case the functionality of the quantum program is to generate a certain quantum state, and the design error indicates that a range of 0-2% error is tolerable, the quantum circuit may be synthesized to generate the certain quantum state with an error probability of 2% or less. In such cases, the quantum circuit may not implement one or more portions, gates, or the like, of the program, as long as such an omission does not violate the indicated design error.

In some exemplary embodiments, the circuit synthesizer may generate the quantum circuit dynamically, select the quantum circuit from a library of program implementations, or the like. In some exemplary embodiments, the circuit synthesizer may generate implementations using a library of program implementations that retains, together with each implementation, a respective average fidelity loss. In other cases, the circuit synthesizer may generate implementations based on any automatic method, algorithm, technique, or the like. For example, the circuit synthesizer may correspond to Functional Level Processing Component 130 and/or Dynamic Implementation Generator 1240 of U.S. application Ser. No. 17/499,082, titled "Dynamic Synthesis Of Gate-Level Implementations Of Functional Blocks In Quantum Circuits", filed Oct. 12, 2021, which is hereby incorporated by reference in its entirety for all purposes without giving rise to disavowment.

In some exemplary embodiments, the circuit synthesizer may not be hardware specific, and thus synthesized circuits may be provided to a hardware-specific compiler, who may be aware of properties of a target quantum computer. In some exemplary embodiments, the compiler may be configured to apply one or more optimizations to each implementation, e.g., at any of the stages of FIG. 1, or at any other timeframe. For example, the compiler may be configured to optimize the resource allocation of each implementation, according to properties of the target quantum computer on which the implementation is intended to be executed.

In some exemplary embodiments, resources used by each quantum circuit (e.g., after being optimized by the compiler) may be determined. In some exemplary embodiments, each resource may be associated with an estimated hardware error that may be hardware-specific. For example, hardware errors of circuit components (e.g., Hardware Errors 224 of FIG. 2) may be approximated by the manufacturer of a specific quantum hardware in fidelity terms (e.g., average fidelity or average fidelity loss), and may be provided to the user. As another example, hardware errors may be approximated using fidelity benchmarks. As another example, hardware errors may be approximated by a user, such as by using a local agent to estimate independent error rates of circuit components.

In some exemplary embodiments, the design error range, and the hardware errors may be represented with one or more unified metrics. For example, the errors may be quantified using fidelity metrics, such as a state fidelity metric, an average gate fidelity metric (also referred to as 'average fidelity'), or the like. In some exemplary embodiments, the state fidelity may quantify a success rate of computation of a quantum state, while the average fidelity may quantify a success rate of a computation of a specific gate. In some exemplary embodiments, in case an error rate is not provided or determined in fidelity terms, such errors may be converted to be represented with fidelity metrics.

In some cases, the state fidelity metric may be defined as the overlap between a desired quantum state and an actual quantum state. For example, in case a desired state is denoted by $|\psi\rangle\langle\psi|$, and an actual state is denoted by $|\phi\rangle\langle\phi|$, the state fidelity of the actual quantum state may be calculated, e.g., as follows:

$$F = |\langle\psi|\phi\rangle\rangle^2 \tag{1}$$

wherein the desired state and the actual state are given by the respective unit vectors $\phi$, and $\psi$. In some exemplary embodiments, in case the actual state is not pure, but mixed, the above definition may be generalized. For example, for a pure state (denoted by the vector $\psi$) and a mixed state (denoted by the density matrix $\rho$), the definition of the state fidelity metric may be generalized to $\langle\psi,\rho\psi\rangle$.

In some exemplary embodiments, the average gate fidelity metric may quantify a success rate of a computation of a specific gate, by obtaining a set of one or more qubits having a known initial state, applying an inverse gate operation on the set, and applying the gate itself (the non-inverse gate) on the set of qubits. The resulting state of the set of qubits, e.g., the final state is then compared to the initial state, to identify any differences. In an ideal situation, there may not be a difference between the initial and final states, as any difference may indicate noise. In some exemplary embodiments, overlaps between the initial and the final states of the set of qubits may be averaged over the qubits (e.g., over the Haar measure), to determine the average gate fidelity of the applied gate, e.g., as follows:

$$F(\varepsilon) = \int d\psi \langle \psi | \varepsilon(U^\dagger | \psi\rangle\langle\psi | U) | \psi\rangle \tag{2}$$

wherein denotes a desired specific unitary gate, and denotes an actual quantum operation gate in the realistic program.

In some exemplary embodiments, the domain of the average gate fidelity metric and the state fidelity metric may range between the values of 0 and 1. In some exemplary embodiments, the average gate fidelity metric and the state fidelity metric may be bounded by a value of 1. For example, a fidelity score of 1 may correspond to a perfect behavior. In some exemplary embodiments, a fidelity loss metric may be calculated by subtracting a determined fidelity from the value of 1. For example, a state fidelity loss metric may be calculated by subtracting the state fidelity from the value of 1, while an average fidelity loss may be calculated by subtracting the average gate fidelity from the value of 1, e.g., as follows:

$$\text{State Fidelity Loss} = 1 - F = 1 - |\langle\psi|\phi\rangle\rangle^2 \tag{3}$$

$$\text{Average Fidelity Loss} = 1 - F(\varepsilon) = 1 - \int d\psi \langle\psi | \varepsilon(U^\dagger | \psi\rangle\langle\psi | U) | \psi\rangle. \tag{4}$$

In some exemplary embodiments, the design error range, and the hardware errors may be approximated, estimated, or the like, and represented with one or more unified metrics. For example, metrics such as the average fidelity, the average fidelity loss, or the like, may be utilized for estimating hardware errors of each program implementation (e.g., determined by the circuit synthesizer), for representing the design errors of each program implementation, or the like. In some exemplary embodiments, hardware errors of a quantum circuit may be obtained in terms of fidelity, or converted to a fidelity metric. For example, based on the average fidelity loss of a gate (e.g., or any other component) of a quantum computer, all such gates in an implementation of the program may be assigned the same average fidelity loss. In some exemplary embodiments, any other errors, such as design errors, input errors (e.g., in case program inputs are known), or the like, may be obtained in terms of fidelity, or converted to the fidelity metrics. In such cases, each fidelity metric may be provided using one or more exact values, or using upper bounds. For example, the average fidelity loss of a gate may be defined by an upper bound.

In some exemplary embodiments, in case that an error type is not provided in terms of fidelity, one or more mathematical calculations may be performed in order to convert such errors to a respective fidelity metric. For example, a design error may be provided as a Frobenius norm between the desired unitary gate and the actual unitary gate, and the design error may be converted to a respective fidelity metric according to one or more equations disclosed by M. Nielsen, A simple formula for the average gate fidelity of a quantum dynamical operation, Arxiv (2002), which is hereby incorporated by reference in its entirety for all purposes without giving rise to disavowment.

In some exemplary embodiments, an overall hardware error of a program implementation may be estimated, approximated, or the like, such as based on the hardware errors of the circuit components (e.g., all the circuit components) in the program implementation. For example, the overall hardware error may be determined by a compiler, by a local software agent, or the like, with respect to a target quantum hardware. In case of a local approximation, a hardware error rate of each component in the circuit implementation may be combined to form an overall hardware error, an upper bound of an overall hardware error, or the like. For example, in accordance with the triangle inequality principle, an upper bound of an overall hardware error may be determined to be bound by a sum of the hardware errors of the components of the circuit. In some exemplary embodiments, overall hardware errors may be determined for all program implementations, a portion thereof, or the like.

In some exemplary embodiments, for each alternative implementation, a set of values (e.g., an ordered set of values, also referred to as a tuple) may be determined, generated, or the like, e.g., by the software agent. For example, the set of values of an implementation may comprise the design error of the implementation, the overall hardware error of the implementation, and resources or components used by the implementation, or the like. In some cases, the set of values of an implementation may indicate a number of resources of each type used by the implementation, an averaged or weighted overall number of resources, a number of resources of a defined type, or the like. For example, tuples may be generated for each alternative implementation that is generated by circuit synthesizer and optimized by the compiler for a certain quantum computer. As another example, tuples may be generated for each alternative implementation that is generated by circuit synthesizer, without being optimized by the compiler.

In some exemplary embodiments, for each tuple, a total error rate of the respective implementation may be determined, calculated, obtained, or the like. In some exemplary embodiments, the overall error rate of the tuple may be determined based on the respective overall hardware error rate represented by fidelity metrics, the design error represented by fidelity metrics, input errors represented by fidelity metrics, or the like. In some exemplary embodiments, the total error rate may be obtained by one or more mathematical procedures. For example, the overall error rate of each program implementation may be determined by summing up the different error rates, combining the different error rates, or the like. For example, the overall error rate of a program implementation may comprise a summation of at least the overall hardware error and the design error of the implementation, at least since the overall error rate may be bound to the sum of its composite errors, in accordance with the triangle inequality principle. In other cases, the overall error rate may be determined in any other manner.

In some cases, since errors may be treated as deviations from ideal, infeasible circuits, errors may be expressed as, or converted to, quantum operations that implement such deviations. In some exemplary embodiments, the overall error rate of a tuple may be determined by expressing all design errors of a program implementation as a first composite quantum operation, with an upper bound that is based on a combination of the design errors of the program implementation. For example, the errors of each of the individual operations that compose the composite quantum operation may define the upper bound of the composite quantum operation. In some exemplary embodiments, the overall hardware error may be expressed as a second quantum operation and applied to the previous operations, e.g., the first composite quantum operation. In some cases, the input errors of a known input (if such an input exists) may be expressed as a third quantum operation, with an upper bound that is based on a combination of all input errors of the program implementation, and may be applied to the previous operations.

In some exemplary embodiments, the overall error rate of the tuple may be determined to comprise an upper bound of the resulting operations. In some exemplary embodiments, the overall error rate of a tuple may implement a certain tradeoff between errors. For example, each alternative implementation, and its respective tuple, may represent a different tradeoff between errors. In some exemplary embodiments, a tradeoff may exist between hardware errors and design errors. In some exemplary embodiments, in order to decrease a design error, a circuit may be required to increase a number of resources, resulting with a greater-sized circuit. As circuits become larger, they become more prone to hardware errors, thus defining an opposite correlation between hardware errors and design errors, e.g., as depicted in FIG. 4.

Figure 4:
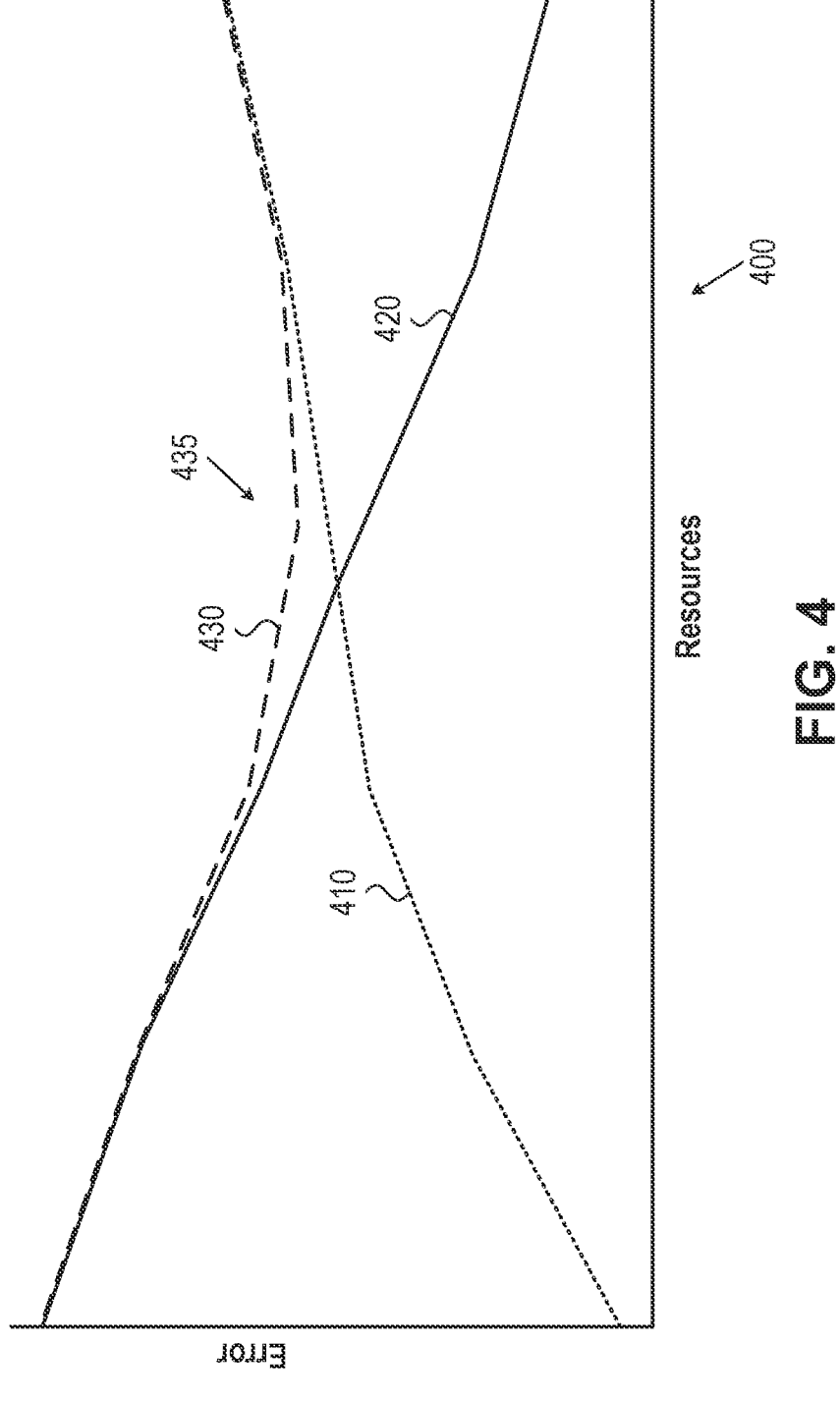
FIG. 4 shows an exemplary dual-axis chart, in accordance with some exemplary embodiments of the disclosed subject matter.

Referring now to FIG. 4, showing an exemplary dual-axis chart, in accordance with some exemplary embodiments of the disclosed subject matter. As depicted in FIG. 4, Chart 400 may depict a graph of a hardware error function, a design error function, and a total error function. It is noted that every point on the resource axis corresponds to at least one potential implementation of a quantum program that uses a respective number of resources. It is noted that not all potential implementations may necessarily be synthesized, such as in order to conserve resources. For example, program implementations may be synthesized for one or more defined ranges of resources, errors, or the like, with a defined unified or non-unified distance. According to this example, a single program implementation may be synthesized for each range, such as according to a top of the range, a bottom of the range, or any other definition or heuristic. In some exemplary embodiments, for each selected point or range in the resource axis, one or more alternative implementations may be available, synthesized, or the like. For example, multiple alternative implementations may be available for a point in the in the resource axis, and one implementation may be selected by an optimizer to be synthesized.

In some exemplary embodiments, a hardware error of program implementations, e.g., Hardware Error 410, may monotonically increase with the number of resources. For example, as a circuit that implements a quantum program utilizes a greater number of resources, resulting with a greater-sized circuit (e.g., in terms of resources), Hardware Error 410 may increase. In some exemplary embodiments, a design error of the program implementations, e.g., Design Error 420, may decrease monotonically with the number of resources. For example, as a circuit that implements a quantum program utilizes a greater number of resources, resulting with a greater-sized circuit, Design Error 420 may decrease, indicating that the circuit is more similar to an ideal infeasible circuit (e.g., a circuit with an infinite size) compared to a circuit that utilizes less resources. In other cases, Chart 400 may comprise any other error function in addition to or instead of Design Error 420 and Hardware Error 410, such as an input error function.

In some exemplary embodiments, the overall error rates of the program implementations, e.g., Total Error 430, may be estimated based on a combination of Hardware Error 410 and Design Error 420. For example, summing the graphs of Hardware Error 410 and the Design Error 420 may result with Total Error 430. In some exemplary embodiments, Total Error 430 may comprise an Optimum Point 435, which may comprise a global minimum of Total Error 430. In some exemplary embodiments, Optimum Point 435 may indicate a resource allocation associated with a design error, for which the overall error of a circuit reaches a minimum point, balancing between different error types. For example, the resource allocation may be defined according to a weighted or non-weighted metric that combines different resource types. In some exemplary embodiments, decreasing Design Error 420 beyond Optimum Point 435 may no longer be beneficial due to an increase in Hardware Error 410, e.g., as depicted in FIG. 4. For example, in case a circuit implementation of the quantum program will utilize more resources than the number of resources represented by Optimum Point 435, the overall error will increase due to Hardware Error 410 increasing. In case a circuit implementation of the quantum program will utilize less resources than the number of resources represented by Optimum Point 435, the overall error will increase due to Design Error 420 increasing.

In some exemplary embodiments, in case a user wishes to implement the quantum program with a minimal overall error, the implementation of the quantum program may be selected to correspond to the resources associated with Optimum Point 435, to the design error associated with Optimum Point 435, or the like. For example, in case Optimum Point 435 indicates a certain design error, it may be advantageous to select an implementation of the quantum program that utilizes the respective design error, e.g., since utilizing a lesser or a greater design error may result with a higher overall error rate.

In some exemplary embodiments, Optimum Point 435 may be detected regardless of Chart 400, based on Chart 400, manually, automatically, or the like. For example, Chart 400 may be generated based on overall error rates of each synthesized implementation, and Chart 400 may be analyzed to detect Optimum Point 435. As another example, Optimum Point 435 may be detected automatically by using a search algorithm. As another example, Optimum Point 435 may be detected automatically without using a search algorithm, e.g., by obtaining a set of program implementations (e.g., from a library), iterating over all the implementation tuples to identify the overall error rates of each implementation, comparing the overall error rates, and identifying a global minimum point. In other cases, Optimum Point 435 may be detected in any other way.

In some cases, Optimum Point 435 may be detected by applying a search algorithm over a search space that comprises the alternative implementations with their tuples, to identify a global minimum point therein. In some cases, a search algorithm may utilize a Constraint Satisfaction Problem (CSP) solver, as disclosed in U.S. application Ser. No. 17/149,326, titled "Quantum Circuit Modeling", filed Feb. 8, 2022, which is hereby incorporated by reference in its entirety for all purposes without giving rise to disavowment. For example, the CSP solver may take into account hardware constraints of the quantum computer. In some exemplary embodiments, instead of exhaustively iterating over all alternative implementations, their tuples, or the like, one or more search algorithms may be deployed in order to search for an optimal alternative representation. In some exemplary embodiments, the search algorithm may comprise a gradual assent algorithm, a hill climbing algorithm, a binary search, a greedy search algorithm, or any other global search algorithms.

For example, a search algorithm may be applied by selecting one or more random or predetermined design errors for the program. For example, two predetermined design errors may be selected, two design errors with a predetermined distance between them may be selected, or the like. The overall error rates of program implementations that correspond to the first and second design errors, may be determined. In case the overall error rate of the first design error is lesser than the overall error rate of the second design error, a design error that is more proximate to the first design error may be selected and its overall error may be estimated, until reaching a global minimum point. In other cases, any other search algorithm may be used, iterating over one or more implementations in any defined order, heuristic, or the like.

In some exemplary embodiments, the error rates represented by Chart 400 may be hardware specific, e.g., as they may be based on Hardware Error 410 of a specific target hardware. In case a different quantum computer is intended to be used, or a selection of a target hardware is attempted to be made between a number of potential quantum computers, optimum points may be determined for each hardware platform (e.g., quantum computer), for each allocation of qubits within each hardware platform, or the like, e.g., using respective charts, search algorithms, or the like. The optimum points of each hardware platform may be compared, or analyzed in any other way, to identify an optimum point that is lesser than all the rest of the optimum points, indicating that executing an implementation that corresponds to the optimum point on the respective hardware platform will result with a lowest overall error.

In some exemplary embodiments, Total Error 430 may exclude input errors. In some exemplary embodiments, Total Error 430 may include one or more input errors such as quantum input errors, classical input errors, or the like. In some exemplary embodiments, in case Total Error 430 is configured to include input errors in its calculation, the input errors, or upper bounds thereof, may be determined, e.g., by the compiler, combined with Hardware Error 410 and Design Error 420, or the like. In some cases, optimum points of Total Error 430 may or may not vary according to different inputs, e.g., since a program may be more sensitive to certain inputs than to others. For example, a first input may result with the optimum point being associated with a first design error, an associated resource allocation, or the like, while a second input may result with the optimum point being associated with a second, different design error, an associated different resource allocation, or the like.

One technical effect obtained by the disclosed subject matter is enabling to find an implementation of a quantum program that minimizes an overall error rate. In some exemplary embodiments, given a quantum program, a quantum platform, an input to the program, or the like, the software agent may identify the optimum design error for implementing the quantum program, synthesize a respective circuit, and execute the circuit on the quantum platform, resulting with an execution that minimizes an overall error rate. In some cases, instead of minimizing the overall error rate, an overall cost function may be minimized using the disclosed subject matter. For example, a cost function may define weights, or costs, for each resource unit, error unit, a combination thereof, or the like. According to this example, a graph such as Chart 400 may be generated or adjusted to indicate the cost function that is associated with the resource axis and the respective total errors. For example, tuples may be generated to include a number of resources (e.g., a point on the resource axis of Chart 400), an overall error (the respective point in Total Error 430), and a cost value provided by the cost function for the respective resources and overall error. A minimum point of the cost function may be identified using a search algorithm, a Constraint Satisfaction Problem (CSP), or the like, and a respective quantum circuit may be generated.

Another technical effect obtained by the disclosed subject matter is enabling to find a minimal number of resources that is required for implementing a quantum program with a requested error upper bound. In some exemplary embodiments, given a quantum program, a quantum platform, and a requested error upper bound, the software agent may be enabled to calculate the minimum circuit size required for satisfying the error upper bound, such as based on the overall error metric. For example, the agent may utilize a search algorithm, a Constraint Satisfaction Problem (CSP), an exhaustive iteration, or the like, on multiple alternative implementations of the program, tuples thereof, or the like, in order to identify an implementation of a quantum program that complies with the error upper bound, and follows immediately after a previous implementation of the quantum program that does not comply with the error upper bound, thereby identifying an implementation with a smallest usage of resources that complies with the error upper bound.

Yet another technical effect obtained by the disclosed subject matter is enabling a user to identify an optimal design error for implementing a quantum program. For example, the optimal design error may correspond to the optimum point of the overall error rate. In response, the user may select the recommended design error for implementing the program, select a different design error such as according to a cost function, or the like.

Yet another technical effect obtained by the disclosed subject matter is enabling a user to select an optimal hardware platform for a quantum program execution. For example, the disclosed software agent may calculate an optimum error point for each hardware. The agent may recommend the user to utilize a hardware platform having a lowest optimum point that has a lower error rate than the remaining optimum points. In some cases, the agent may synthesize a circuit corresponding to the recommended optimum point, execute the circuit on the recommended platform, or the like. The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

It is noted that the term 'optimal', as used herein, may refer to a solution that comprises a global optimum point, a local optimum point, or neither. In some cases, an optimal solution may refer to a solution that complies with one or more thresholds, that complies with one or more constraints, and has a lowest overall error rate. In other cases, a local optimum may be used, and an optimal solution may refer to a solution that is within a defined range of sufficiently good results, is within a defined percentile of the results, or the like. In some cases, obtained results may depend on a type of search algorithm that is used to detect solutions, on termination conditions of the search algorithm, or the like. For example, a search algorithm may be configured to terminate upon finding an implementation that complies with one or more constraints, and has a lower overall error rate than nearby points that were assessed by the search algorithm.

Figure 5:
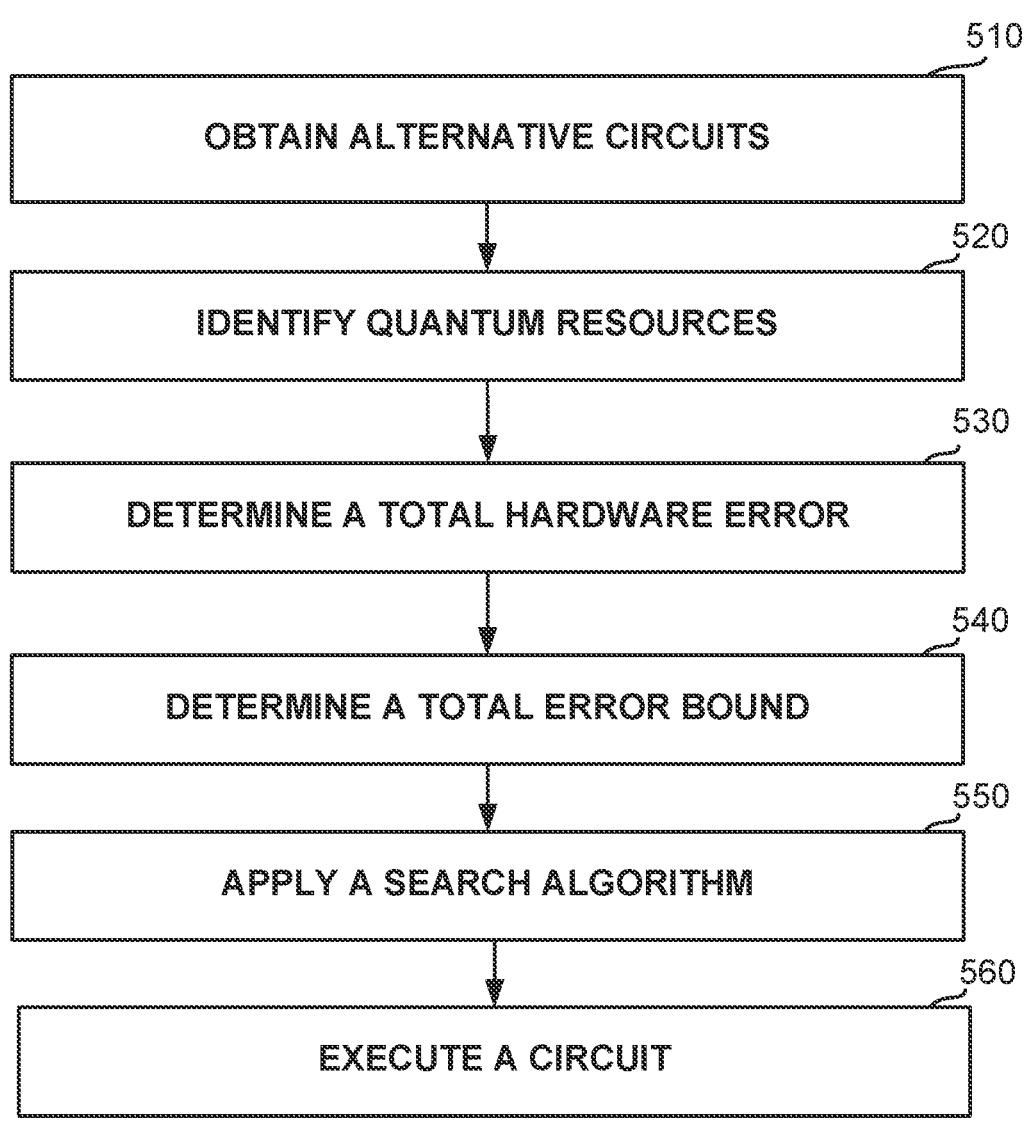
FIG. 5 shows an exemplary flowchart diagram of a method, in accordance with some exemplary embodiments of the disclosed subject matter.

Referring now to FIG. 5, showing an exemplary flowchart diagram of a method, in accordance with some exemplary embodiments of the disclosed subject matter.

On Step 510, a plurality of alternative quantum circuits implementing a quantum program may be obtained, determined, synthesized, or the like. In some exemplary embodiments, each of the plurality of alternative quantum circuits may have a respective, different, design error. For example, each of the plurality of alternative quantum circuits may correspond to different range of design errors.

In some exemplary embodiments, the plurality of alternative quantum circuits may be obtained from a library that retains a plurality of quantum implementations of the quantum program, a plurality of quantum implementations of portions of the quantum program, or the like. In some exemplary embodiments, the plurality of alternative quantum circuits may be dynamically synthesized based on the quantum program, a selected design error, a design error range, or the like. For example, the plurality of alternative quantum circuits may be dynamically generated according to a respective plurality of design errors.

In some exemplary embodiments, the plurality of alternative quantum circuits may or may not be optimized by a compiler. For example, the software agent may provide the plurality of alternative quantum circuits to a hardware compiler associated with the respective platform, and obtain from the compiler a plurality of optimized quantum circuits.

On Step 520, for each quantum circuit of the plurality of alternative quantum circuits, respective quantum resources that are used by the quantum circuit may be identified. In some exemplary embodiments, the quantum resources may comprise components that are associated with respective hardware errors of a quantum computer. For example, the quantum resources may comprise qubits, cycles, quantum gates, quantum gates of a defined type, or the like, all of which may be associated with respective hardware errors. In some exemplary embodiments, each hardware error may estimate a probability of the respective component not to function properly, to function properly, or the like. For example, a hardware error of a quantum gate may indicate an estimated probability of the quantum gate not to function properly.

In some exemplary embodiments, in case that the plurality of alternative quantum circuits were optimized by a compiler, the respective quantum resources may be identified with respect to the optimized quantum circuits. For example, quantum resources that are used by the optimized quantum circuit may be identified.

On Step 530, based on the quantum resources and the respective hardware errors, a total hardware error bound for the quantum circuit may be determined. For example, the total hardware error bound may be determined by summing hardware error bounds of circuit components. In some cases, total hardware error bounds may be determined for all of the plurality of alternative quantum circuits, a portion thereof, or the like.

On Step 540, based on the total hardware error bound and based on a design error of the quantum circuit, a total error bound for the quantum circuit may be determined, calculated, approximated, or the like. In some exemplary embodiments, the design error of the quantum circuit may comprise an intended error for the quantum circuit that is intended to reduce a resource utilization of the quantum circuit, at the expense of reducing an accuracy of the quantum circuit. In some cases, total error bounds may be determined for all of the plurality of alternative quantum circuits, a portion thereof, or the like.

On Step 550, a search algorithm may be applied over a plurality of total error bounds of the plurality of alternative quantum circuits, to identify an optimal total error bound that is lesser than other total error bounds. In some exemplary embodiments, the optimal total error bound may be associated with an optimal quantum circuit from the plurality of alternative quantum circuits.

In some exemplary embodiments, the search algorithm may comprise one or more global or local search algorithms such as a gradual assent algorithm, a hill climbing algorithm, a binary search algorithm, or the like.

On Step 560, the optimal quantum circuit may be executed on the quantum computer, a quantum cloud, or the like. In some exemplary embodiments, known hardware error rates may be used to adjust, or rectify, the final state of the quantum circuit. For example, a final state outputted by the optimal quantum circuit may be adjusted according to the overall error rate bound thereof. In some cases, known error rates may be used to determine a number of executions of the optimal quantum circuit. For example, higher error rates may result with more executions than lower error rates, such as in order to obtain more exact results.

Figure 6:
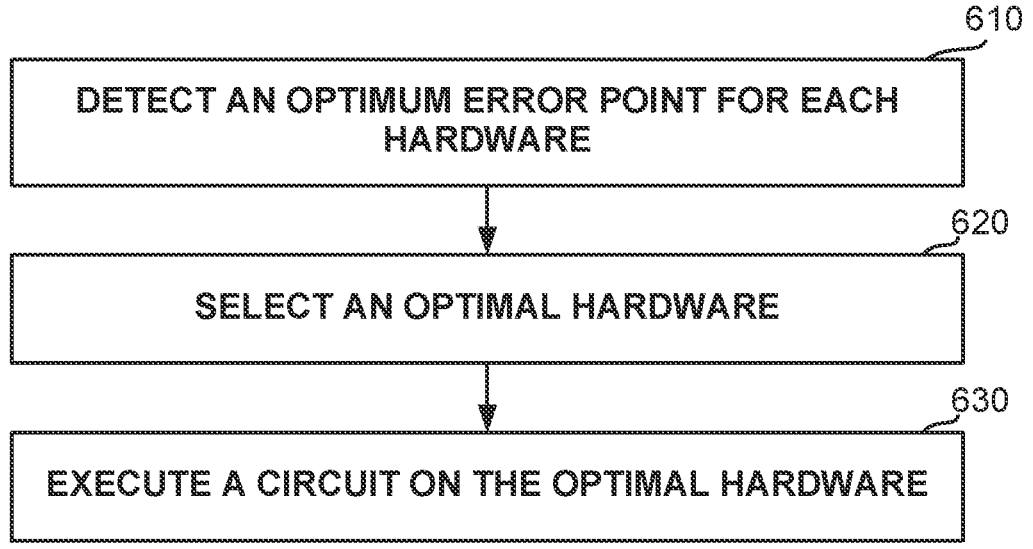
FIG. 6 shows an exemplary flowchart diagram of a method, in accordance with some exemplary embodiments of the disclosed subject matter.

Referring now to FIG. 6, showing an exemplary flowchart diagram of a method, in accordance with some exemplary embodiments of the disclosed subject matter.

On Step 610, an optimum point may be detected for different hardware platforms, quantum computers, or the like. For example, for each hardware platform, an optimal total error bound may be detected, e.g., according to the steps of FIG. 5. For example, Steps 520 and 530 of FIG. 5 may be performed for each hardware platform, according to their respective hardware error approximations.

On Step 620, based on the optimal total error bounds of each hardware platform, an optimal hardware platform may be selected. For example, the optimal hardware platform may be suggested to the user, selected automatically for executing a circuit, or the like.

In some exemplary embodiments, the optimal hardware platform may be selected by comparing the optimal total error bounds of each hardware platform, applying search algorithm thereon, or the like, and identifying that the optimal hardware platform has a best optimal total error bound (e.g., lower than the optimal total error bounds of the remaining platforms).

On Step 630, a quantum circuit may be executed on the optimal hardware platform. For example, the quantum circuit may comprise an implementation of a quantum program that has a design error that corresponds to the optimal total error bound of the optimal hardware platform.

Another technical solution provided by the disclosed subject matter may comprise implementing a plurality of quantum programs in a joint circuit, such that an overall error rate of the joint circuit implementation is minimized. In some exemplary embodiments, multiple quantum programs, functions, or the like, may be determined, obtained, or the like, e.g., by a software agent. For example, the agent may obtain a set of programs, an indication of a target quantum computer, their inputs, a requested total error upper bound for all the programs, or the like.

Figure 7:
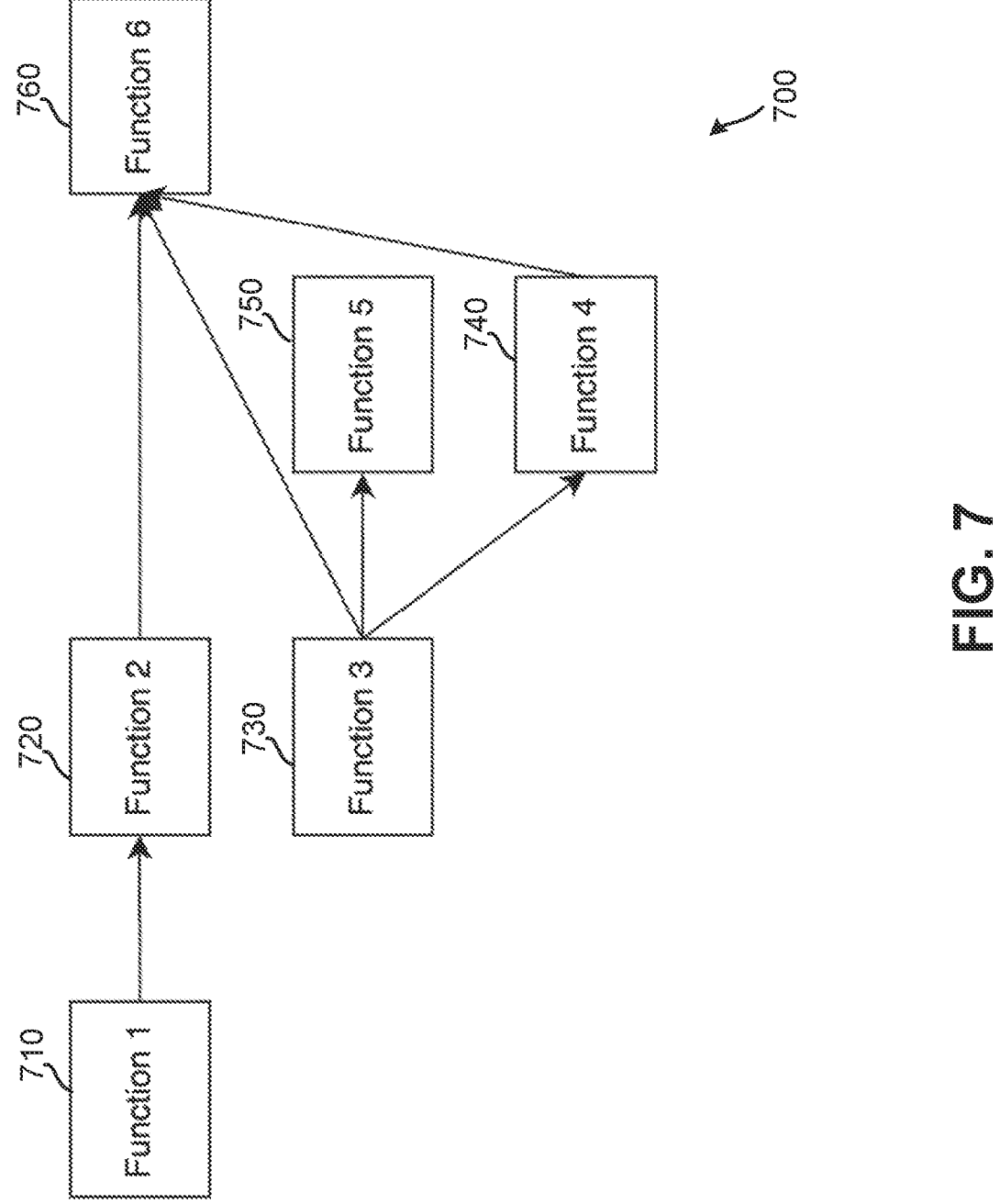
FIG. 7 shows an exemplary Directed Acyclic Graph (DAG), in accordance with some exemplary embodiments of the disclosed subject matter.

In some cases, a relationship between at least a portion of the programs, such as a dependency relationship, may exist. In such cases, the relationship may be indicated via a diagram, such as a Directed Acyclic Graph (DAG), via metadata, or in any other way. Referring now to FIG. 7, showing an exemplary DAG, in accordance with some exemplary embodiments of the disclosed subject matter. In some exemplary embodiments, DAG 700 may depict a relationship between Functions 710-760, each of which constituting a quantum program. For example, as depicted in DAG 700, Function 720 may depend on an output from Function 710, Functions 740, 750, and 760 may depend on an output from Function 730, and Function 760 may depend on an output from Function 740. In other cases, any other dependency relationship may exist between the functions, programs, or the like.

In some exemplary embodiments, for each program, a plurality of alternative implementations may be generated, synthesized, obtained, or the like, the alternative implementations having different design errors, ranges of design errors, or the like. In some exemplary embodiments, for each program, an overall hardware error rate may be determined, e.g., according to the method of FIG. 5. In some cases, an overall error rate may be determined for each program, e.g., according to the method of FIG. 5.

In some exemplary embodiments, overall error bounds of different combinations of program implementations may be determined. In some exemplary embodiments, programs may share resources, such as auxiliary qubits, which may affect the total error rate of the joint circuit. In some exemplary embodiments, some programs may be more sensitive than other to the input errors, thus potentially affecting the total error rate of the joint circuit when considering the input error.

In some exemplary embodiments, instead of exhaustively iterating over all different combinations of implementations that create respective joint circuits, a search algorithm may be applied on the programs. In some exemplary embodiments, the search algorithm may be executed over a large search space, e.g., larger than the search space described by FIG. 4, which may comprise the design error of each program, the overall error rate of each program, the resource allocation or components of each program (e.g., as may be optimized by the compiler), possibilities to share resources between programs, or the like. In some cases, the search algorithm may iterative over at least some combinations of program implementations, and identify an optimal design error for each program. For example, the optimal design errors may comprise errors for which the corresponding program implementations create a joint circuit with the lowest total error possible for the set of programs and a quantum device.

In some exemplary embodiments, the search algorithm may comprise a global search algorithm, a constraint solver, or the like. For example, a CSP solver may be utilized to minimize an overall error of a joint circuit, while ensuring that each program implementation complies separately with global constraints of the target hardware platform (e.g., a number of qubits available at the platform, a number of cycles that can be implemented at the platform), and that the joint circuit complies with the global constraints. For example, the global constraints may define that a total resource allocation for each program may not exceed a constraint on the resources available at the quantum device. In some exemplary embodiments, the search algorithm may comprise a non-greedy search, at least since an optimal implementation of a specific program may not necessarily be optimal in the context of the joint circuit.

In some exemplary embodiments, an overall error of a joint circuit may be determined based on overall errors of each program therein. For example, the design errors of the implementations may be summed, overall hardware errors may be estimated for each implementation and summed, and the sums of the design and hardware errors may be combined, thereby obtaining an upper bound of an overall error of the joint circuit. As another example, the overall error of each implementation may be used as an input error of a subsequent implementation, iteratively, thereby obtaining an upper bound of an overall error of the joint circuit. For example, the errors of the implementations may be combined according to one or more methods disclosed by The NIST Reference on Constants, Units, and Uncertainty, "Combining uncertainty components", available at physics.nist.gov/cuu/Uncertainty/combination.html, which is hereby incorporated by reference in its entirety for all purposes without giving rise to disavowment.

One technical effect obtained by the disclosed subject matter is enabling to find an implementation of a plurality of quantum programs that minimizes an overall error rate. In some exemplary embodiments, given a plurality of quantum programs, a quantum platform, or the like, the software agent may identify the optimum design error for implementing each quantum program, synthesize a joint circuit implementing the plurality of quantum programs, and execute the joint circuit on the quantum platform.

Another technical effect obtained by the disclosed subject matter is enabling to find a minimal number of resources that is required for implementing a plurality of quantum programs with a requested error upper bound. The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 8:
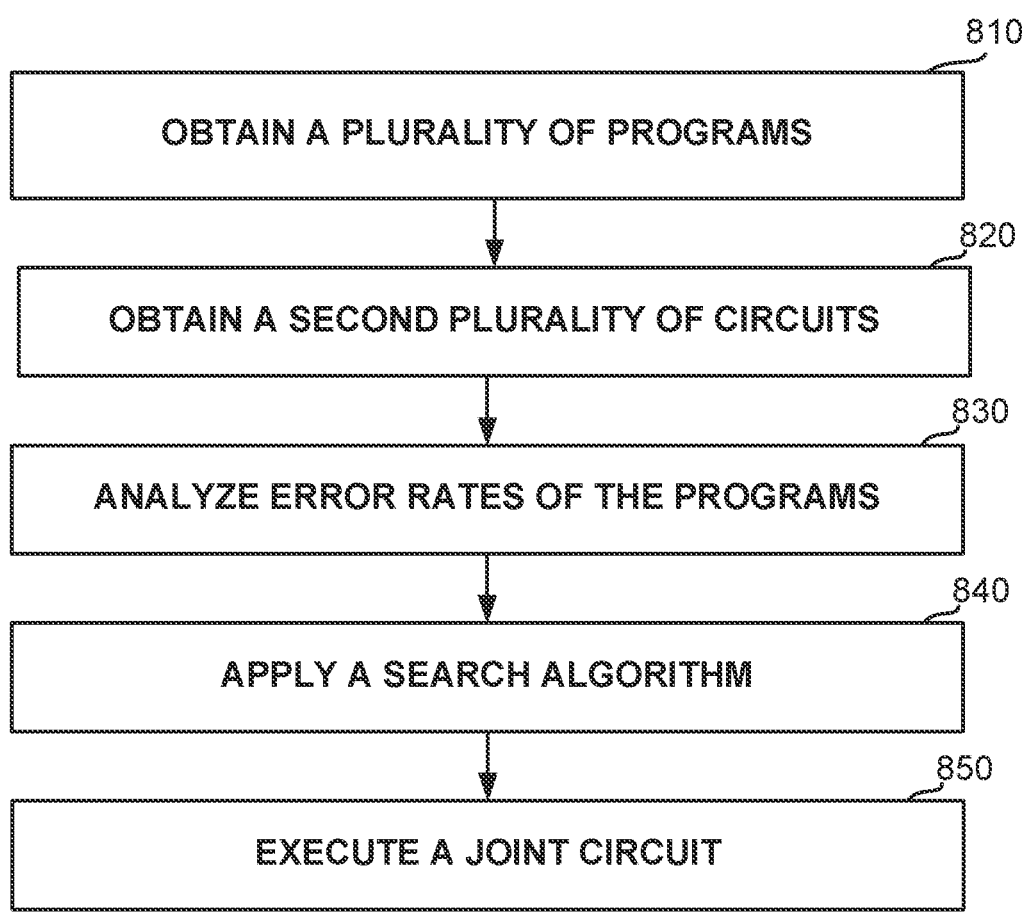
FIG. 8 shows an exemplary flowchart diagram of a method, in accordance with some exemplary embodiments of the disclosed subject matter.

Referring now to FIG. 8, showing an exemplary flowchart diagram of a method, in accordance with some exemplary embodiments of the disclosed subject matter.

On Step 810, a plurality of quantum programs may be obtained, e.g., as a DAG indication, as metadata, or in any other way. In some exemplary embodiments, the programs may be intended to be executed on a quantum computer as a joint quantum circuit.

On Step 820, obtaining a second plurality of quantum circuits, comprising alternative implementations of each quantum program. In some exemplary embodiments, the second plurality of quantum circuits may comprise at least a first set of alternative quantum circuits that implement a first quantum program of the plurality of quantum programs, and a second set of alternative quantum circuits that implement a second quantum program of the plurality of quantum programs. For example, each circuit of the first set of alternative quantum circuits may have a different design error, and each circuit of the second set of alternative quantum circuits having a different design error.

On Step 830, error rates of the second plurality of quantum circuits may be analyzed, determined, or the like. In some cases, resources used by each circuit of the second plurality of quantum circuits may be identified, and errors thereof may be determined, e.g., according to the steps of the method of FIG. 5. For example, Steps 520-540 of FIG. 5 may be performed for each of the second plurality of quantum circuits, thus enabling to determine the total error bound of each circuit.

On Step 840, based on global constraints of the quantum computer, one or more search algorithms may be applied over total error bounds of the second plurality of quantum circuits. In some exemplary embodiments, the search algorithm may be configured to find, for each of the plurality of quantum programs, an optimal quantum circuit from the second plurality of quantum circuits that implements the quantum program, complies with the global constraints, and reduces an overall error rate of a joint quantum circuit that comprises a respective circuit from the second plurality of quantum circuits for each of the plurality of quantum programs.

On Step 850, the joint quantum circuit may be executed on the quantum computer.

Figure 9:
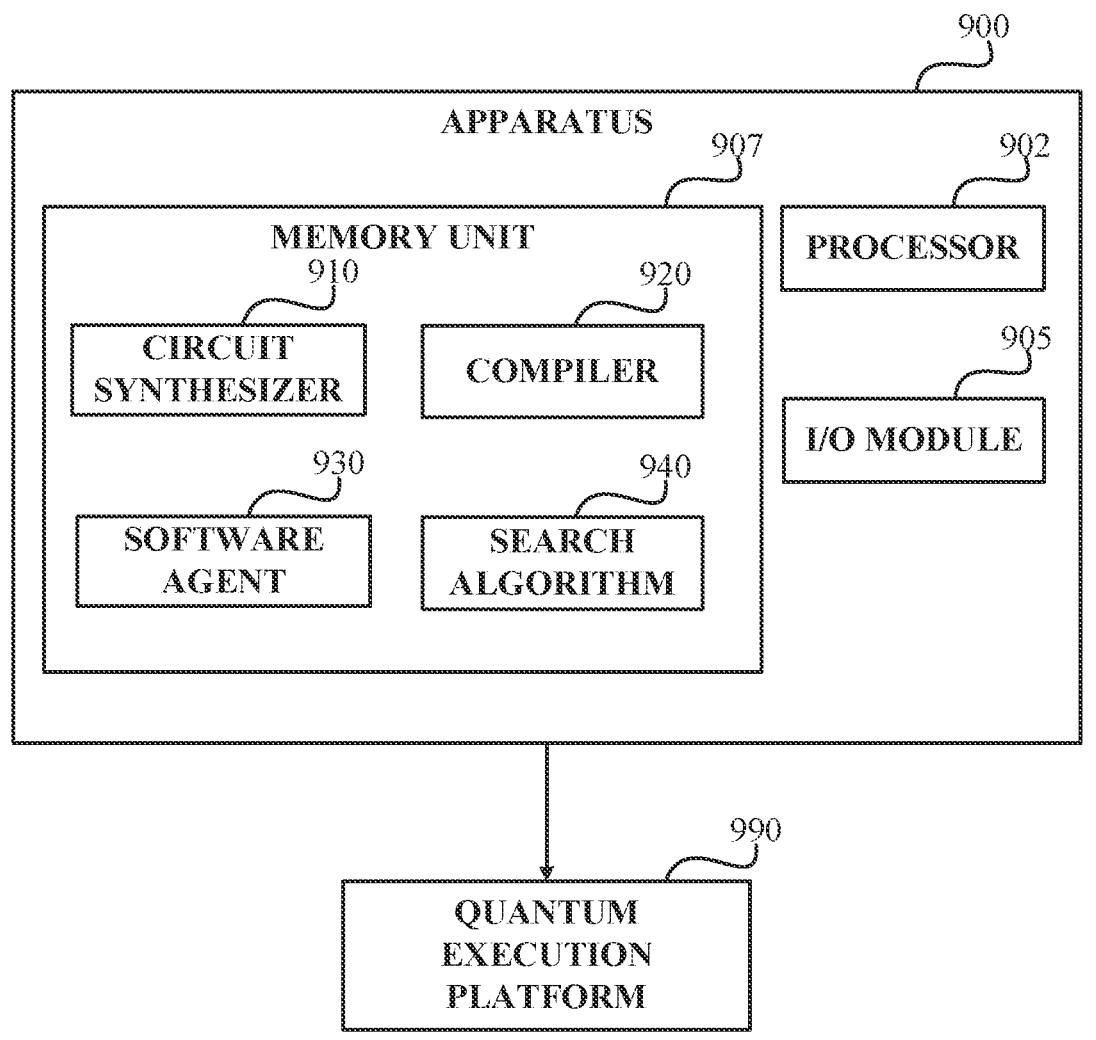
FIG. 9 shows an exemplary block diagram of an apparatus, in accordance with some exemplary embodiments of the disclosed subject matter.

Referring now to FIG. 9 showing a block diagram of an apparatus, in accordance with some exemplary embodiments of the disclosed subject matter.

In some exemplary embodiments, Apparatus 900 may comprise one or more Processor(s) 902. Processor 902 may be a Central Processing Unit (CPU), a microprocessor, an electronic circuit, an Integrated Circuit (IC) or the like. Processor 902 may be utilized to perform computations required by Apparatus 900 or any of its subcomponents. It is noted that Processor 902 may be a traditional classical processor, and not necessarily a quantum processor.

In some exemplary embodiments of the disclosed subject matter, Apparatus 900 may comprise an Input/Output (I/O) module 905. I/O Module 905 may be utilized to provide an output to and receive input from a user, an apparatus, or the like, such as, for example to obtain a user-defined quantum program, showing circuit illustrations, communicating with quantum hardware, obtaining a quality measurer, or the like.

In some exemplary embodiments, Apparatus 900 may comprise Memory 907. Memory 907 may be a hard disk drive, a Flash disk, a Random Access Memory (RAM), a memory chip, or the like. In some exemplary embodiments, Memory 907 may retain program code operative to cause Processor 902 to perform acts associated with any of the subcomponents of Apparatus 900. Memory 907 may comprise one or more components as detailed below, implemented as executables, libraries, static libraries, functions, or any other executable components.

In some exemplary embodiments, Memory 907 may comprise a Circuit Synthesizer 910. Circuit Synthesizer 910 may be configured to synthesize quantum circuits that implement a quantum program with various design errors. For example, Circuit Synthesizer 910 may synthesize a first circuit for a first design error, a second circuit for a second design error, and so on.

In some exemplary embodiments, Memory 907 may comprise a Compiler 920, which may be configured to compile quantum circuits generated by Circuit Synthesizer 910, apply one or more resource optimizations thereto, or the like.

In some exemplary embodiments, Memory 907 may comprise a Software Agent 930, which may be configured to select a set of one or more design errors, activate Circuit Synthesizer 910 to synthesize the circuits, activate Compiler 920 to optimize the circuits, utilize Search Algorithm 940, or the like. In some exemplary embodiments, Software Agent 930 may analyze data regarding the quantum circuits, such as errors thereof, resources used thereby, or the like, and estimate an overall error rate of each quantum circuit, of a portion thereof, or the like. In some exemplary embodiments, Software Agent 930 may comprise a classical software agent such as a software development kit, a desktop application, a web-based application, a components of a high level processor, a component of a processing cloud, or the like. For example, Software Agent 930 may correspond to Functional Level Processing Component 130 of U.S. application Ser. No. 17/499,082, titled "Dynamic Synthesis Of Gate-Level Implementations Of Functional Blocks In Quantum Circuits", filed Oct. 12, 2021.

In some exemplary embodiments, Memory 907 may comprise a Search Algorithm 940, which may be configured to search for optimal implementations of the quantum program. Search Algorithm 940 may identify an optimum point within a search space of overall errors of program implementations.

In some exemplary embodiments, Circuit Synthesizer 910 may be configured to synthesize a quantum circuit with an overall error rate that corresponds to the optimum point, e.g., as identified by Search Algorithm 940. In some exemplary embodiments, in addition to synthesizing the quantum circuit, Circuit Synthesizer 910 may be configured to execute the quantum circuit on Quantum Execution Platform 990, or any other execution platform.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:
obtaining a plurality of alternative quantum circuits implementing a quantum program, each of the plurality of alternative quantum circuits having a respective design error;
generating, by a compiler, a plurality of optimized quantum circuits, wherein the compiler receives the plurality of alternative quantum circuits, wherein the plurality of optimized quantum circuits implementing the plurality of alternative quantum circuits based on properties of a quantum computer;
identifying, for each quantum circuit of the plurality of optimized quantum circuits, respective quantum resources that are used by the quantum circuit, the quantum resources comprising components that are associated with respective hardware errors of the quantum computer, the components comprising at least a quantum gate;
based on the quantum resources and the respective hardware errors, determining a total hardware error bound for the quantum circuit;
based on the total hardware error bound and based on a design error of the quantum circuit, determining a total error bound for the quantum circuit;
applying a search algorithm over a plurality of total error bounds of the plurality of optimized quantum circuits, to identify an optimal total error bound that is lesser than other total error bounds, wherein the optimal total error bound is associated with an optimal quantum circuit from the plurality of optimized quantum circuits; and executing the optimal quantum circuit on the quantum computer.

2. The method of claim 1, wherein a hardware error of the quantum gate indicates an estimated probability of the quantum gate of the quantum computer not to function properly.

3. The method of claim 1, wherein the components comprise at least one of: a qubit, a cycle, and a defined type of gate.

4. The method of claim 1, wherein said obtaining comprises obtaining the plurality of alternative quantum circuits from a library that retains a plurality of quantum implementations of the quantum program.

5. The method of claim 1 further comprising obtaining the quantum program, wherein said obtaining the plurality of alternative quantum circuits comprises synthesizing the plurality of alternative quantum circuits based on the quantum program.

6. The method of claim 5, wherein said synthesizing comprises dynamically generating the plurality of alternative quantum circuits according to a respective plurality of design errors.

7. The method of claim 1, wherein the design error comprises an intended error for the quantum circuit that is intended to reduce a resource utilization of the quantum circuit.

8. The method of claim 1, wherein the search algorithm comprises at least one of: a gradual assent algorithm, a hill climbing algorithm, and a binary search algorithm.

9. The method of claim 1 further comprising:
obtaining a plurality of quantum programs, the plurality of quantum programs comprising the quantum program;
performing said generating for each of the plurality of quantum programs, thereby obtaining a second plurality of optimized quantum circuits;
performing said identifying, said determining the total hardware error bound, and said determining the total error bound for each circuit of the second plurality of optimized quantum circuits;
based on global constraints of the quantum computer, applying the search algorithm over total error bounds of the second plurality of optimized quantum circuits, the search algorithm is configured to find, for each of the plurality of quantum programs, an optimal quantum circuit from the second plurality of optimized quantum circuits that complies with the global constraints, and reduces an overall error rate of a joint quantum circuit that comprises a respective circuit from the second plurality of optimized quantum circuits for each of the plurality of quantum programs; and
executing the joint quantum circuit on the quantum computer.

10. The method of claim 9, wherein the plurality of quantum programs comprises first and second quantum programs, wherein the second plurality of optimized quantum circuits comprises a first set of alternative quantum circuits that implement the first quantum program, and a second set of alternative quantum circuits that implement the second quantum program, each circuit of the first set of alternative quantum circuits having a different design error, each circuit of the second set of alternative quantum circuits having a different design error.

11. An apparatus comprising a processor and coupled memory, said processor being adapted to:

obtain a plurality of alternative quantum circuits implementing a quantum program, each of the plurality of alternative quantum circuits having a respective design error;

generate, by a compiler, a plurality of optimized quantum circuits, wherein the compiler receives the plurality of alternative quantum circuits, wherein the plurality of optimized quantum circuits implementing the plurality of alternative quantum circuits based on properties of a quantum computer;

identify, for each quantum circuit of the plurality of optimized quantum circuits, respective quantum resources that are used by the quantum circuit, the quantum resources comprising components that are associated with respective hardware errors of the quantum computer, the components comprising at least a quantum gate;

based on the quantum resources and the respective hardware errors, determine a total hardware error bound for the quantum circuit, based on the total hardware error bound and based on a design error of the quantum circuit, determine a total error bound for the quantum circuit;

apply a search algorithm over a plurality of total error bounds of the plurality of optimized quantum circuits, to identify an optimal total error bound that is lesser than other total error bounds, wherein the optimal total error bound is associated with an optimal quantum circuit from the plurality of optimized quantum circuits; and execute the optimal quantum circuit on the quantum computer.

12. The apparatus of claim 11, wherein the search algorithm comprises at least one of: a gradual assent algorithm, a hill climbing algorithm, and a binary search algorithm.

13. The apparatus of claim 11, wherein a hardware error of the quantum gate indicates an estimated probability of the quantum gate of the quantum computer not to function properly.

14. The apparatus of claim 11, wherein the components comprise at least one of: a qubit, a cycle, and a defined type of gate.

15. The apparatus of claim 11, wherein said obtaining comprises obtaining the plurality of alternative quantum circuits from a library that retains a plurality of quantum implementations of the quantum program.

16. The apparatus of claim 11, wherein the processor is further adapted to obtain the quantum program, wherein said obtain the plurality of alternative quantum circuits comprises synthesizing the plurality of alternative quantum circuits based on the quantum program, wherein said synthesizing comprises dynamically generating the plurality of alternative quantum circuits according to a respective plurality of design errors.

17. The apparatus of claim 11, wherein the design error comprises an intended error for the quantum circuit that is intended to reduce a resource utilization of the quantum circuit.

18. A system comprising:

a quantum computer;

a classical software agent configured to obtain a plurality of alternative quantum circuits implementing a quantum program, each of the plurality of alternative quantum circuits having a respective design error;

a classical compiler configured to receive the plurality of alternative quantum circuits and to generate a plurality of optimized quantum circuits, wherein the plurality of optimized quantum circuits implementing the plurality of alternative quantum circuits based on properties of the quantum computer;

wherein the classical software agent is configured to:

identify, for each quantum circuit of the plurality of optimized quantum circuits, respective quantum resources that are used by the quantum circuit, the quantum resources comprising components that are associated with respective hardware errors of the quantum computer, the components comprising at least a quantum gate;

based on the quantum resources and the respective hardware errors, determine a total hardware error bound for the quantum circuit;

based on the total hardware error bound and based on a design error of the quantum circuit, determine a total error bound for the quantum circuit; and apply a search algorithm over a plurality of total error bounds of the plurality of optimized quantum circuits, to identify an optimal total error bound that is lesser than other total error bounds, wherein the optimal total error bound is associated with an optimal quantum circuit from the plurality of optimized quantum circuits; and wherein the quantum computer is configured to execute the optimal quantum circuit.

* * * * *